INVENTORS
FRED V. HALL
BROOKS WALKER

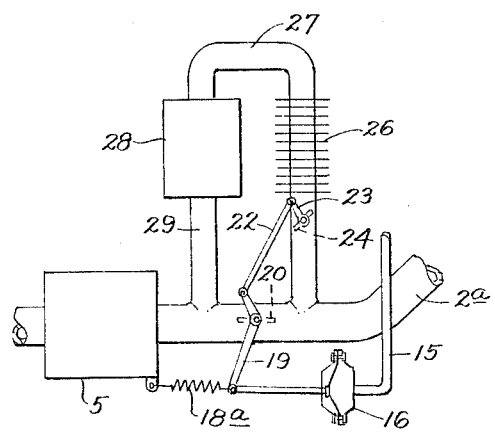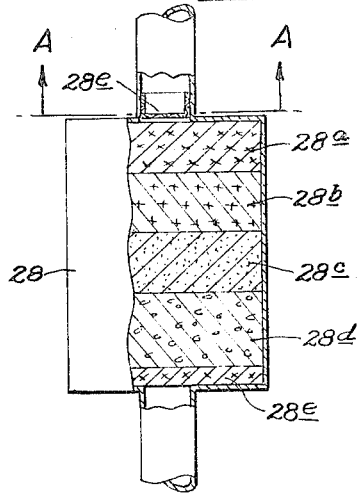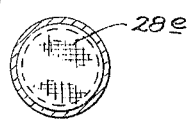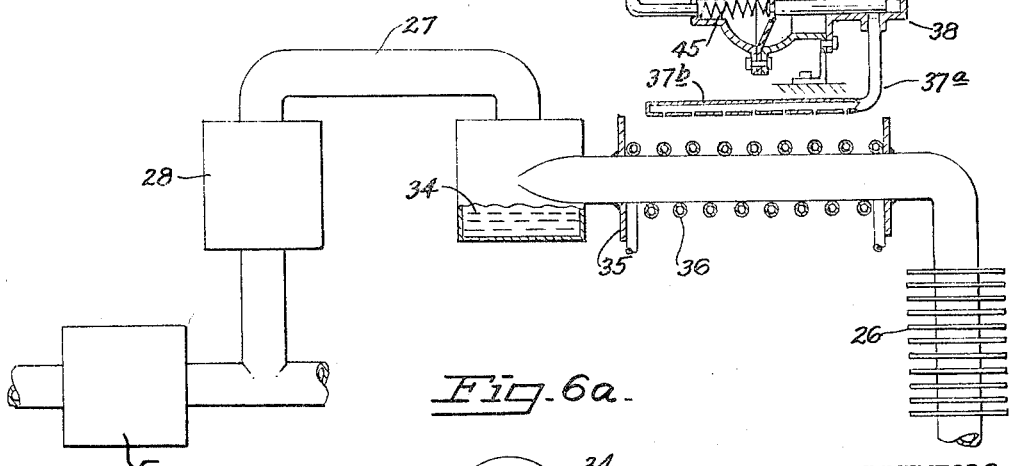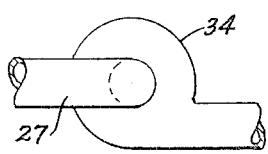
INVENTORS
FRED V. HALL
BROOKS WALKER

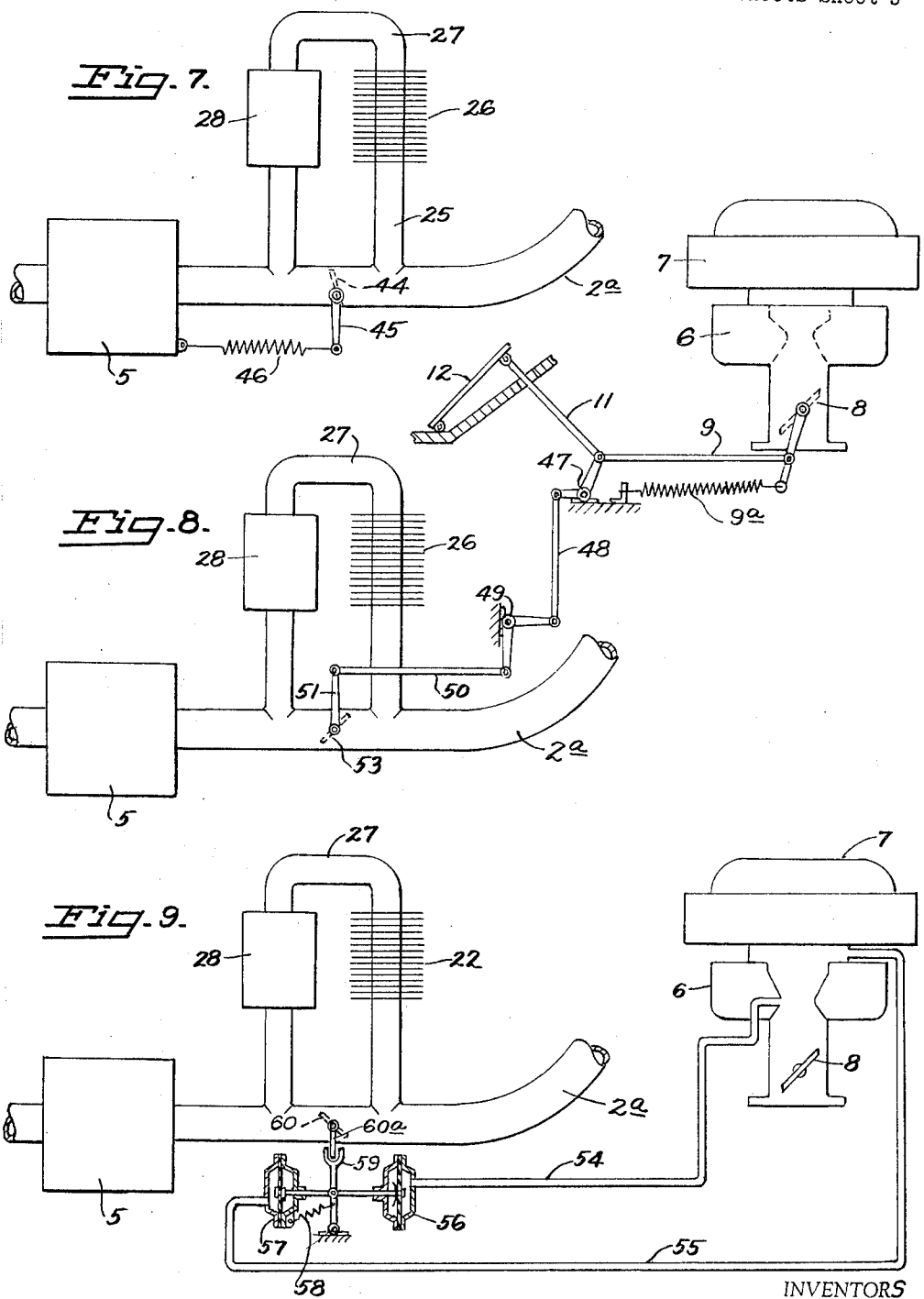

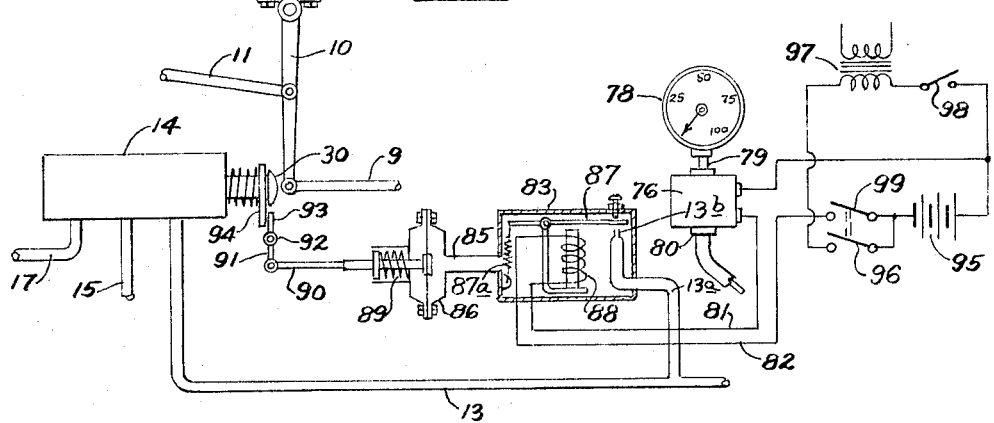
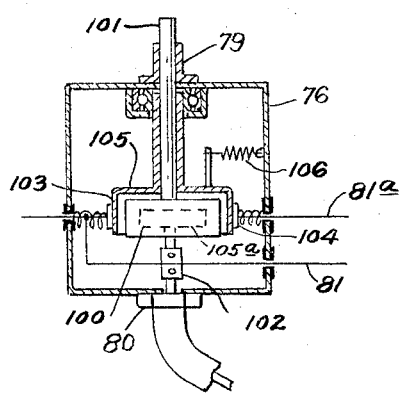
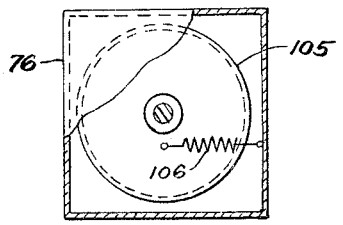
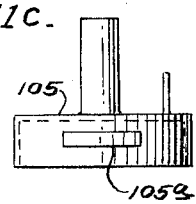

United States Patent Office 3,282,046
Patented Nov. 1, 1966

3,282,046
AUTOMATIC TREATMENT OF SELECTED
PORTIONS OF EXHAUST GASES
Brooks Walker, 1280 Columbus Ave., San Francisco,
Calif., and Fred V. Hall, San Francisco, Calif.; said
Hall assignor to said Walker
Filed June 11, 1964, Ser. No. 374,549
6 Claims. (Cl. 60—29)

This invention relates to means for the automatic treatment of selected portions of exhaust gases, more specifically to a device for removal of exhaust pollutants from automotive vehicle exhausts during certain engine operating conditions.

An object of the present invention is to provide means which are readily adaptable to existing or new automobiles.

Another objective is to provide a device which will remove with a high degree of efficiency exhaust pollutants and which will optimize the requirements for size and cost.

Still another object of the present invention is to provide a means for efficient removal of exhaust pollutants which will not lose efficiency with age.

It is also an object of this invention to provide apparatus and means for treatment of exhaust gas which is readily renewable with respect to efficiency and which provides convenient means for disposal of the collected pollutants.

Still another object is to provide an automatic by-pass system which selects the most important modes of operation and automatically treats the exhaust from these modes of operation to remove exhaust pollutants.

The smog problem in large metropolitan areas has been linked to pollutants from automobile exhausts. These pollutants include hydrocarbon, carbon monoxide, nitrogen oxides, lead compounds, soot, etc. The concentration of pollutants varies considerably with operating conditions as does the exhaust flow rate. At high exhaust flows, characteristic of very high speed driving or more usually to accelerating conditions an enormous exhaust filter device would be required. Fortunately, however, these conditions can and usually do allow efficient combustion in the engine. Inefficient combustion with the attendant result of high concentration of hydrocarbons and carbon monoxide is generally characteristic of the low exhaust flow rate cycles of idle and deceleration. The treating of either or both of these cycles is envisioned together with or without selected portions of other cycles such as the low power cruises and/or the first portion of acceleration.

FIG. 4, an elevation view, shows the vacuum operated by-pass valve in the "on" position, that is, bypassing exhaust through the exhaust treater.

FIG. 5 is an elevation view with portions partially cut away of the exhaust treater showing its multilayer construction of various treating agents, filter, screens, etc.

FIG. 5a shows more details of area A—A of FIG. 5.

FIG. 6 is an elevation view, partly cut away, of an alternate means for the exhaust treater including an evaporative exhaust cooler, centrifugal particulate and water removal device together with the exhaust treater of FIG. 5.

FIG. 6a is a plan view, partly cut away, of the centrifugal separator 34 of FIG. 6.

FIG. 7 is a plan view of an alternate spring operated automatic by-pass valve for diverting exhaust through the treater portion.

FIG. 8 is a plan view of an alternate throttle operated automatic by-pass valve for diverting exhaust through the treater portion.

FIG. 9 is a plan view of an alternate automatic by-pass valve operated by the differential pressure across the carburetor venturi.

Figure 10:
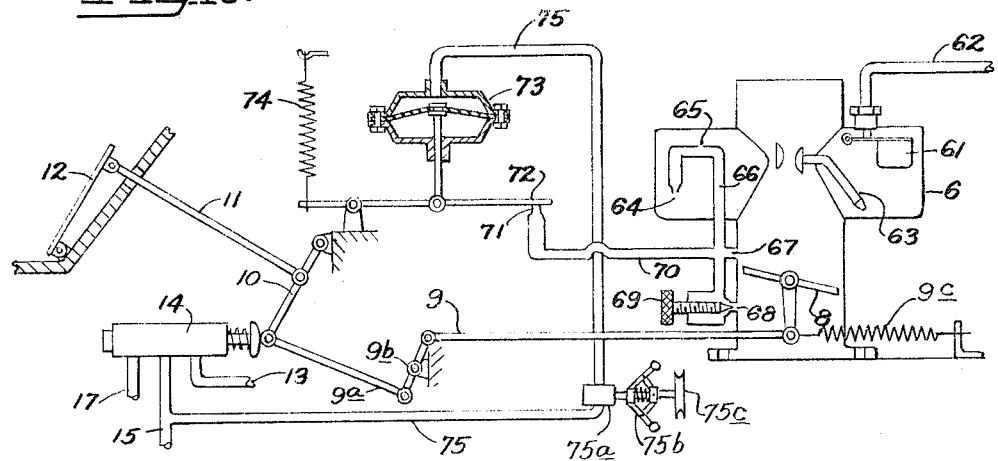

FIG. 10 is a schematic elevation partly in section and with portions cut away showing an "air bleed" type idle mixture cut off which operates in conjunction with the automatic exhaust by-pass system.

Figure 1:
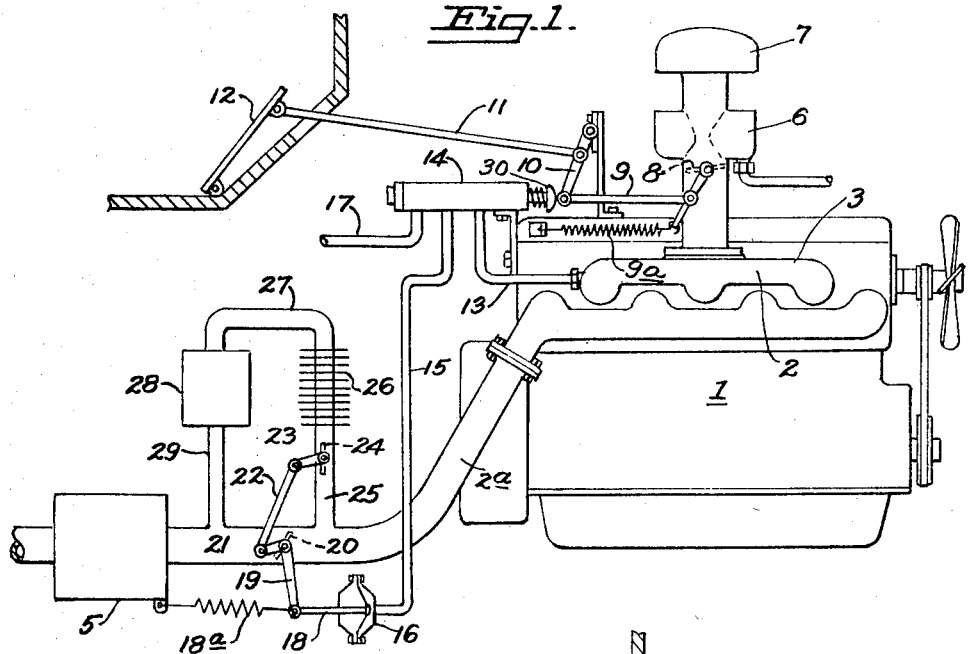
FIG. 1 is an elevation view of an automobile engine including the carburetor, intake manifold, exhaust manifold, muffler together with a vacuum operated version of the present invention.

FIG. 11 is an elevation view of portions of FIG. 1 with a speed responsive overriding interlock added as an alternate means of control.

FIG. 11a is an elevation view of the speed responsive element of FIG. 11.

FIG. 11b is a plan view of the speed responsive element of FIG. 11 with portions omitted and portions cut away for clarity.

FIG. 11c is a detailed view of the drag cup portion of the speed responsive element.

Figure 12:
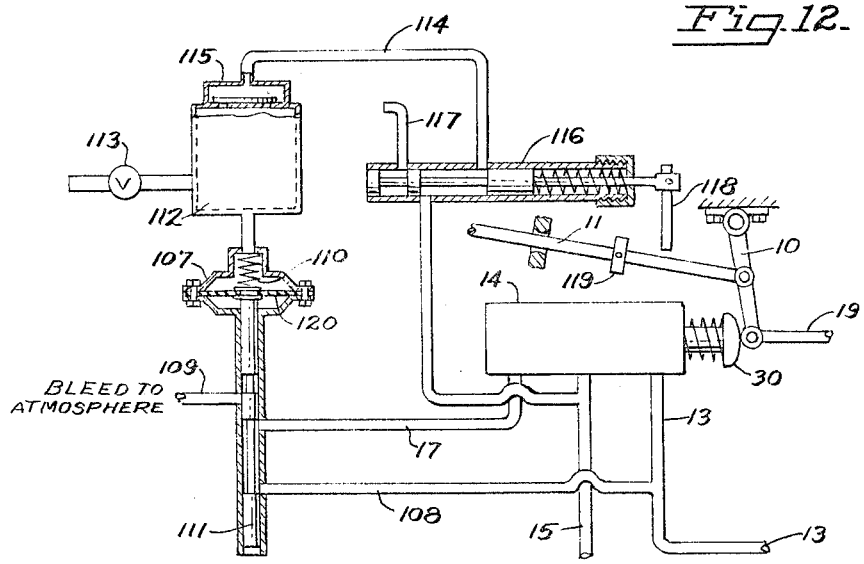

FIG. 12 shows the three ported vacuum control valve 14 of FIG. 1 with a time delay action control and a throttle position overriding interlock.

In FIG. 1, 1 is an automotive engine, with the exhaust manifold 2, exhaust header pipe 2a, intake manifold 3, and muffler 5 shown. The carburetor 6 with the air cleaner 7, throttle butterfly valve 8, throttle link rod 9 connected to lever 10, the center of which connects to throttle lever rod 11 which is actuated by accelerator pedal 12 are also shown. Tube 13 connects at one end to intake manifold 3 and on the other end to the three ported actuating valve 14. Tube 15 connects the three ported actuating valve 14 to vacuum diaphragm operator 16. Tube 17 connects the spill port of three ported actuating valve 14 to the atmosphere. Rod 18 which is returned by spring 18a is connected to bell crank 19 which operates main exhaust butterfly 20. Bell crank 21 links rod 22 and bell crank 23 interconnects exhaust by-pass butterfly valve 24 with main exhaust butterfly 20 and vacuum diaphragm operator 16. Tube 25 connects exhaust header pipe 2a to finned by-pass exhaust cooler 26 which is connected to exhaust treater 28 by tube 27. Dump tube 29 connects exhaust treater 28 to the downstream portion of exhaust header pipe 2a.

Figure 2:
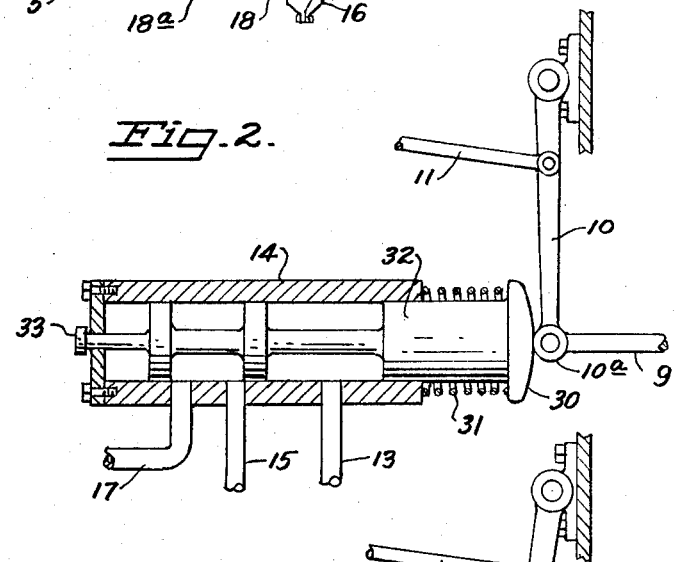
FIG. 2 is an elevation view of the throttle interlocked vacuum valve for operating the automatic exhaust by-pass valve shown in the "off" position, that is, no vacuum to the automatic by-pass valve and no "by-pass."

In FIG. 2, which shows three ported actuating valve 14, 30 is a bumper which is connected to the one end of spool valve plunger 32 which is urged toward the right by spring 31 and limited in its motion by limit stop 33. The lower end 10a of double ended lever 10 is shown at a position where accelerator pedal 12 (FIG. 1) is depressed somewhat. Port 14a admits atmosphere through head 14b to allow valve plunger 32 to move without pressures between valve plunger 32 and head 14b.

Figure 3:
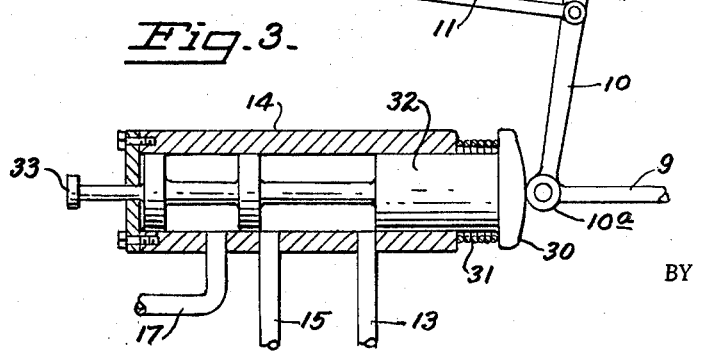
FIG. 3 is an elevation view of the throttle interlocked vacuum valve shown in the "on" position.

Referring to FIG. 3, this shows the same three ported actuating valve 14 of FIGS. 1 and 2, but in its "on" position. Lever 10 (FIG. 1 and FIG. 2) is now in the position where the accelerator pedal 12 (FIG. 1) is released (engine butterfly valve 8 closed to idle position). In this position exhaust butterfly 20 is closed by diaphragm actuator 16 and valve 24 is open, as shown in FIG. 1.

In FIG. 4, the exhaust by-pass of FIG. 1 system is shown in the normal or "off" position. Main exhaust butterfly 20 is held in the open position by the action of spring 18a and lever 19. Valve 14 will be in the position shown in FIG. 2.

In FIG. 5, the internal construction of the exhaust treater 28 is illustrated wherein 28a, b, c, d show the position of various adsorbents, filter media and/or chemical agents. FIG. 5a shows the construction of the screen filter 28e.

In FIG. 6, centrifugal separator 34 is connected to exhaust treater 28 (FIG. 1) by tube 27 (of FIG. 1). Evaporative cooler 35 is connected at one end to finned by-pass exhaust cooler 26 and at the other end to centrifugal separator 34. Absorbent cotton wicking 36 absorbs water which drips from perforated end 37b of water pipe 37a. Water valve 38 is actuated by diaphragm operator 39 by vacuum transmitted through tube 41. Spring 40 urges the diaphragm 39a towards the right or closed position of valve 38. Tube 37 connects valve 38 to water tank 42 which is filled through fill cap 43.

In FIG. 6a, the top view of the centrifugal separator of FIG. 6 is shown.

In FIG. 7 the exhaust by-pass system of FIG. 1 is shown except that the vacuum actuated valves are replaced by an automatic by-pass system operated by exhaust gas flow dynamics. By-pass butterfly 44 is urged to the closed position by lever 45 through the action of spring 46 which is attached to the end of lever 45. Exhaust gas flow in exhaust header pipe 2a opens or partially opens the valve and regulates the amount of exhaust gas by-pass. Butterfly valve 44 has an offset pivot at 11 that supports arm 45.

FIG. 8 shows the exhaust by-pass system of FIG. 1 except that a "progressive" throttle linkage system is used to interlock the exhaust by-pass valve instead of a vacuum operated system. Levers and bell cranks 47, 48, 49, 50, and 51 connect the motion of carburetor butterfly valve 8 (FIG. 1) to that of exhaust by-pass butterfly valve 53, to open valve 53 when throttle butterfly valve 8 is open and vice versa.

FIG. 9 shows the exhaust by-pass system of FIG. 1 except that a "mass air flow" responsive control of the exhaust by-pass butterfly valve is used. Tubes 54 and 55 transmit the pressure differential across the carburetor venturi to diaphragm actuators 56 and 57. Their motion is transmitted to exhaust by-pass butterfly 60 by lever 59. High flow through the carburetor venturi circuits suction in line 54 so that valve 60 is wider open at high venturi flow than at low venturi flow in the carburetor.

FIG. 10 shows the carburetor 6, the throttle butterfly 8, throttle link rods 9, 9d, and 11, reverse link 9b, accelerator pedal 12, and three ported vacuum valve 14 similar to FIG. 1. The carburetor float valve assembly 61 regulates fuel brought in by fuel line 62. Main fuel metering system assembly is shown as 63. The idle fuel metering orifice is shown as 64, the idle air bleed as 65, and these connect to the idle transfer port 67 and idle port 68 by means of tube 66. Tube 70 leads from tube 66 to idle air bleed orifice 71. Flapper valve 72 is operated by vacuum diaphragm actuator 73 which is restrained in its motion by spring 74. Tube 75 communicates controlled vacuum from tube 15 (FIG. 1) of three ported vacuum valve 14 (FIG. 1). Engine driven governor 75b operates valve stem 75a to open flow through lines 75 only at engine speeds over about 1000 r.p.m. for decelerating idle fuel shut off control.

FIGS. 11, 11a, 11b, and 11c show the three ported vacuum control valve 14 of FIG. 1 and an automatic speed responsive override control. The speed responsive element 76 is adapted between the end of speedometer cable 77 and speedometer 78 by means of adapter nuts 79 and 80. Wires 81 and 82 lead to electromagnet operated flapper valve assembly 83. Tube 13a leads engine vacuum from tube 13 (FIG. 1) and tube 85 leads controlled vacuum to vacuum diaphragm operator 86. Flapper valve 87 is actuated by electromagnet 88. Return spring 89 urges diaphragm operator 86 to the left the motion of which is transmitted by rod 90, to lever 91, which is pivoted at 92 and terminates in lever 93. Lever 93 presses on bumper extension 94 when diaphragm operator 86 has vacuum applied to it. In the electrical circuit shown, 95 is the battery of the automobile not shown, 96 is the ignition key, 97 is the ignition coil, and 98 is the breaker points of the ignition system. Switch 99 is mechanically interlocked to switch 96 in order to energize the circuit through line 82 to the speed responsive element 76 only when the ignition key is "on." FIGS. 11a and 11b show speed responsive element 76 with portions cut away for clarity. Rotating magnet 100 is supported by rod 101 which engages speedometer cable 80 by means of adapter 102. Brushes 103 and 104 bear on magnetic drag cup 105 which is restrained by spring 106. Magnetic drag cup 105 has an insulating strip 105a (FIG. 11c) which is positioned to switch the current in wires 81 and 81a at predetermined speeds or speed patterns.

FIG. 12 shows the three ported vacuum control valve of FIG. 1 and a time delay interlock together with a throttle position override. Vacuum valve assembly 107 is connected to the dump port of three ported vacuum control valve 14 (FIG. 1) by tube 17 and to engine vacuum line 13 by tube 108. Tube 109 connects the dump port of vacuum valve assembly 107 to the atmosphere. Spring 110 pushes spool valve 111 downward so that the dump port tube 109 is in communication with tube 17 (FIG. 1) when there is no vacuum (negative pressure) in delay accumulator tank 112 which is bled to the atmosphere by bleed valve 113 and connected to tube 114 by check valve 115 to throttle position override assembly 116. Tube 117 is the dump tube which communicates tube 114 to the atmosphere when stop 118 is pushed by adjustable throttle position stop 119. This construction provides a time delay in the opening of valve 20 of FIG. 1 if the throttle is opened suddenly part way and still provides an override if the throttle is opened full, to open valve 20 quickly by this override device at full throttle opening.

The operation of the selective treatment device is as follows: assuming the car is cruising normally and suddenly the driver decelerates by releasing the accelerator pedal 12 (FIG. 1), the arm 10 strikes the bumper 30 (FIG. 2) and by means of valve 14 engine vacuum is applied to diaphragm 16 which actuates butterfly valves 20 and 24 in such a fashion that the exhaust flow in exhaust pipe 2a is diverted through tube 25, cooler 26, and through exhaust treater 28 which contains various treating media such as activated carbon, silica gel, absorption oil on a supporting media, etc. Here the hydrocarbons are adsorbed or absorbed. A catalyst would be used to burn the unburned hydrocarbons as an alternate or combination. The speed of the vehicle may be then assumed to decrease to zero and the engine revert to idle. The exhaust by-pass continues and the hydrocarbon or other pollutants are also removed or drastically reduced during this cycle by passing through exhaust treater 28.

It is advantageous to cool the exhaust before it enters the exhaust treater 28 unless a catalyst is used. (FIGS. 1 and 6.) An evaporative cooling means with automatic control of the water is brought into action by operation of valve 38 by engine vacuum communicated to diaphragm 39 by means of tube 41 which communicates to engine intake manifold 2 so that water for the evaporative cooler is furnished only when the engine is operating. To collect water and particulate matter from the cooled exhaust, a centrifugal separator 34 is provided between the evaporative cooler 35 and the exhaust treater 28 (FIGS. 6 and 6a).

A simplified form of automatic by-pass is shown in FIG. 7 and the operation is as follows: the spring 46 urges the unbalanced by-pass butterfly 44 towards the closed position. With the engine idling, the tension of the spring is chosen to be adequate to close the unbalanced butterfly against the exhaust pressure. As the engine speeds up or the load increases, the exhaust will force unbalanced valve 44 to a more open position, although a proportionate amount of exhaust is still by-passed and treated in exhaust treater 28 (FIG. 7).

Another simplified alternate means is shown in FIG. 8, the operation of which is as follows: with the engine idling, by-pass butterfly valve 53, FIG. 8, is closed and all of the exhaust gas is by-passed through the exhaust treater. This also occurs at deceleration which is a closed throttle operation. At light cruise a portion of the exhaust is also by-passed through the treater. As the throttle is opened farther progressively a lower portion of the exhaust is treated in treater 28.

FIG. 9 shows an automatic by-pass arrangement which is regulated by "mass air flow." The operation is as follows: as the engine idles, there is a relatively low pressure drop through the carburetor venturi which is communicated to the diaphragm motors 56 and 57 (FIG. 9). This pressure difference in lines 54 and 55 actuates butterfly valve 60 which tends to open by the larger differential pressure but is restrained by spring 58 so that substantially all the exhaust is by-passed through cooler 22 and exhaust treater 28 at low differential pressures between lines 54 and 55. Rocker arm 59 with U-shaped end ties the action of diaphragm 56 and 57 to the control lever 60a of butterfly 60. As the engine speeds up in driving the vehicle on level or up grade or the load increases as by acceleration, the pressure drop across the carburetor venturi increases and this is sufficient to open the butterfly valve 60 in proportion to the air flow through the carburetor.

Thus, a predetermined amount of exhaust by-pass can be maintained under load conditions while substantially all the exhaust flow is by-passed and treated for deceleration and cruise.

FIG. 10 shows an air bleed type idle mixture cut off which is coordinated with the exhaust by-pass system as follows: with the engine operating at cruise, assume that the driver release the accelerator pedal 12 (FIG. 10). Valve 14 is actuated on closed throttle together with the exhaust by-pass as previously explained. The same engine vacuum in tube 15 is communicated by tube 75 to diaphragm 73 which urges flapper valve 72 off port 71 but is restrained in this action by spring 74 in such a manner that it opens port 71 at vacuums in excess of idle vacuum which occur under decelerating conditions. Thus, as the driver decelerates, the vacuum is higher than at idle and port 71 is open which air bleeds the idle circuit 66 of the carburetor through tube 70 which stops fuel flow from carburetor bowl 6 through idle orifice 64 and tube 66. This cuts off the fuel supply to the engine on deceleration through idle port 68 and transfer port 67 usually located above the closed or idle position of FIG. 8. As the driver continues to slow down, the vacuum becomes less and at a predetermined vacuum level such as idle of 16 to 21" of mercury suction depending on the engine and spark retard valve port 71 is closed by flapper valve 72 because the force of spring 74 is sufficient to overcome the force of the diaphragm 73. Thus, the engine internal combustion is reestablished as fuel flow is reestablished in idle circuit tube 66 so it will not stall but will idle normally. As an added precaution against the engine stalling at low speeds, governor 75b driven by a belt and pulley 75c from the engine may be used which will only allow flow through vacuum line 75 when the engine speed is below about 1000 r.p.m. This may give better assurance against the engine stalling than just the higher than idle vacuum alone.

In FIGS. 11, 11a, 11b, and 11c, an alternate speed sensitive means is provided for the automatic selection of portions of the exhaust as determined by vehicle speed. The operation is as follows: in FIGS. 11, 11a, and 11c, 76 is a speed sensitive element which operates from the speedometer cable by means of adapter nuts 79 and 80. This speed sensitive element consists of a permanent magnet 100 and a drag cup 105 which is restrained by spring 106. Assuming the car to be cruising at a predetermined speed, e.g. 30 m.p.h., the drag cup would rotate and depending on position of insulating strip 105a, a circuit would be "made" or "broken" between bumpers 103 and 104. This, when "made," would energize electromagnet 88 which would "close" vacuum port in the end of 13a releasing diaphragm 86 from overriding the action of the throttle on bumper 30 of valve 14 which transmits vacuum to line 15. Line 15 (FIGS. 1 and 11) operates the exhaust by-pass system as previously described. By the shape of the insulating strip, the by-passing (and treatment) of the exhaust can take place between various predetermined speeds, e.g. 20–40 m.p.h., or idle to 30. When solenoid 88 is released, spring 87a opens port 13b to provide suction in housing 83 and tube 85 and to actuate diaphragm 86 against spring 89 and through linkage including lever 93 to operate plunger 30 so as to close valve 20 through diaphragm motor 13 shown in FIG. 1. This could be operated at, say, below 30 m.p.h. by proper placement of the contacts on drag cup 105 when the throttle rod 9 of FIGS. 11 and 1 is away from plunger 30 if it was desirable to treat the majority of exhaust gas below said 30 m.p.h. during which time there is often more unburned hydrocarbon in the exhaust than at higher speeds and at greater loads.

FIG. 12 shows an automatic by-pass system which is designed to automatically by-pass a predetermined portion of the exhaust through treater 28 during the first part of the acceleration cycle, e.g. the first 5 seconds of a 15 second acceleration. The operation is as follows: as the throttle is opened, valve 14 (FIG. 1 and FIG. 12) would shut off the vacuum to the by-pass system when the throttle is opened as previously explained. Valve 116 and the "delay assembly" comprised of 107, 109, 110, 111, 114, 113, and 115, components as previously described, "override" the action of valve 14 to provide vacuum to actuate the by-pass system through tube 15 (FIG. 1 and FIG. 12). With the throttle closed and vacuum communicated to actuate the by-pass system through tube 15 as previously explained the operation of the "delay assembly" is as follows: vacuum is built up in accumulator 112 because bleed 113 is small in relation to pumping capacity of engine through tube 114, then the throttle is opened and valve 14 shuts off the vacuum to tube 15 from tube 13 but a new source of vacuum is opened through tube 108 through tube 17, valve 14, and tube 15. This remains open until the accumulator 112 bleeds down through bleed 113 to a point where diaphragm operator 120 causes the port to tube 108 to be closed and opens the port to tube 109 which bleeds down the vacuum to tube 15 rapidly. The delay is regulated by adjusting the bleed valve 113. It can be set so that the first 5 seconds of each acceleration are by-passed (and treated). Valve 116 is a "heavy throttle" override which dumps the vacuum to the by-pass system at heavy throttle openings as regulated by stop 119 on foot throttle rod 111 as the capacity of the by-pass treating system is not sufficient to accommodate wide open or nearly wide open throttle operation for more than this controlled short interval of time unless a very high capacity catalytic treater were used.

We have illustrated our invention in these various forms; however, many other variations may be possible within the scope of this invention.

To those skilled in the art to which this invention relates many changes in construction and widely differing embodiments and applications of the invention will suggest themselves without departing from the spirit and scope of the invention. The disclosures and description herein are purely illustrative and are not intended to be in any sense limiting.

We claim as our invention:

1. In an engine having a fuel feeding system, a throttle means connected to said fuel feeding system, a driver's operable throttle control, an exhaust pipe for conducting the exhaust gases from said engine, an exhaust treating container, a pipe connecting said container to said exhaust pipe, valve means connected to said exhaust pipe, said valve means controlling the portion of said exhaust gases that go to said treatment container, an intake manifold for said engine, a suction operated motor, a second valve, said second valve controlling the flow of the suction from said engine intake manifold to said motor, said second valve being mechanically connected to said throttle means, said motor operating said first valve to direct more exhaust gas to said exhaust treater at low or closed throttle operation than at full throttle operation.

2. An engine having a throttle valve and control mechanism for controlling the rate of fuel feed and to control the power output of said engine, an exhaust manifold, main exhaust pipe, a by pass exhaust system adapted to receive exhaust from said main exhaust pipe and return exhaust gas to said exhaust pipe, an exhaust treating device in said by pass exhaust system, first valve means for closing off said main exhaust pipe so as to turn most of the exhaust for said engine through said auxiliary exhaust system and said exhaust treating system, said first valve means being connected to power means, second valve means independent of said throttle valve, said second valve means being controlled by the position of said control mechanism, said power means being controlled by the position of said throttle control mechanism through said second valve means so that less exhaust gas is treated at wide open throttle than at idle throttle position and most of said exhaust gas from said engine is treated when said throttle is closed.

3. A device as defined in claim 2, said power means including differential gas pressures developed by the running of said engine.

4. A device as defined in claim 2, said engine including a carburetor as part of said fuel feeding system and an intake manifold, said power means including suction developed in said intake manifold when said engine is operating.

5. A device as defined in claim 4, a second valve, said second valve being actuated mechanically by said throttle when near said closed position, said second valve controlling said intake manifold suction to said power means to close said exhaust valve to deflect most of the engine exhaust to said exhaust treatment at closed throttle and to open said exhaust valve when said throttle is in the open full throttle position.

6. A device as defined in claim 2 in which said treater includes absorption material to absorb some of the unburned hydrocarbons from the exhaust gas passing through said absorption device.

References Cited by the Examiner
UNITED STATES PATENTS

| | | |
|---|---|---|
| 1,422,211 | 7/1922 | Lamb. |
| 1,695,554 | 12/1928 | Markels. |
| 2,488,563 | 11/1949 | Sills _____ 60—29 |
| 3,147,588 | 9/1964 | Tauschek _____ 60—30 |
| 3,201,207 | 8/1965 | Lentz _____ 60—30 X |

MARK NEWMAN, *Primary Examiner.*

RALPH D. BLAKESLEE, *Examiner.*